United States Patent
Adragna

(10) Patent No.: US 8,737,092 B2
(45) Date of Patent: May 27, 2014

(54) CONTROL DEVICE FOR A RESONANT CONVERTER

(75) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 75 days.

(21) Appl. No.: 13/281,167

(22) Filed: Oct. 25, 2011

(65) Prior Publication Data

US 2012/0099344 A1 Apr. 26, 2012

(30) Foreign Application Priority Data

Oct. 25, 2010 (IT) ................. MI2010A1969

(51) Int. Cl.
*H02M 3/335* (2006.01)

(52) U.S. Cl.
USPC ........................................ 363/21.02

(58) Field of Classification Search
USPC ........... 363/15, 16, 17, 21.02, 21.03, 21.05, 363/21.07, 21.08, 21.1, 21.12, 21.13, 21.15, 363/21.17, 21.18, 97, 98, 20; 323/212–219
See application file for complete search history.

(56) References Cited

U.S. PATENT DOCUMENTS

| | | | | |
|---|---|---|---|---|
| 5,075,599 A | * | 12/1991 | Overgoor et al. | 315/224 |
| 5,777,864 A | * | 7/1998 | Seong et al. | 363/98 |
| 6,759,834 B2 | * | 7/2004 | Wu | 323/217 |
| 7,190,153 B2 | * | 3/2007 | Stover et al. | 323/282 |
| 7,310,245 B2 | * | 12/2007 | Ohbo | 363/21.02 |
| 2008/0025050 A1 | * | 1/2008 | Spindler | 363/15 |
| 2010/0232183 A1 | | 9/2010 | Yang | |
| 2011/0149614 A1 | * | 6/2011 | Stracquadaini | 363/21.12 |
| 2011/0157926 A1 | * | 6/2011 | Adragna | 363/23 |
| 2011/0157927 A1 | * | 6/2011 | Adragna et al. | 363/26 |
| 2011/0205761 A1 | * | 8/2011 | Tschirhart et al. | 363/21.02 |
| 2012/0033459 A1 | * | 2/2012 | Chang et al. | 363/21.18 |

FOREIGN PATENT DOCUMENTS

JP 09308243 A 11/1997

OTHER PUBLICATIONS

Ye, Z. M. et al., "A Full Bridge Resonant Inverter with Modified Phase Shift Modulation," IEEE 36th Power Electronics Specialists Conference (PESC '05), pp. 642-649, Jun. 16, 2005.

* cited by examiner

*Primary Examiner* — Gary L Laxton
*Assistant Examiner* — Kyle J Moody
(74) *Attorney, Agent, or Firm* — Seed IP Law Group PLLC

(57) ABSTRACT

A control device controls a switching circuit of a resonant converter having an output direct current. The switching circuit includes at least a half-bridge of at least a first and a second transistor connected between an input voltage and a reference voltage. The half-bridge is adapted to generate a periodic square-wave voltage for driving the resonant circuit of said resonant circuit and the periodic square-wave voltage oscillates between a high voltage corresponding to the input voltage and a low voltage corresponding to the reference voltage. The control device comprises a generator adapted to generate a periodic square-wave signal for driving the half-bridge. The control device comprises a detector adapted to detect the phase-shift between the periodic square-wave signal generated by the generating means and the current flowing through the resonant circuit, and adapted to control the turning off of the half-bridge when the phase-shift exceeds a first phase-shift value.

27 Claims, 8 Drawing Sheets

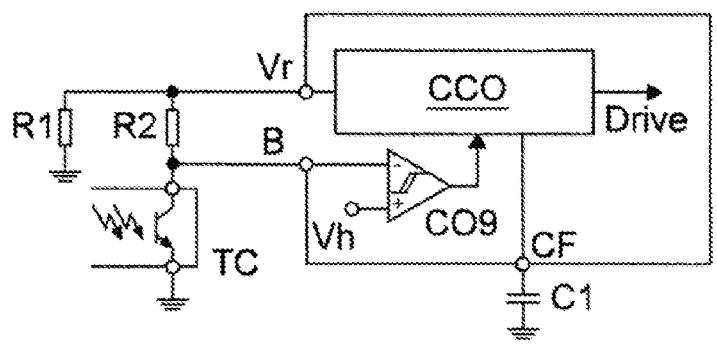
Fig.3 *(Prior Art)*
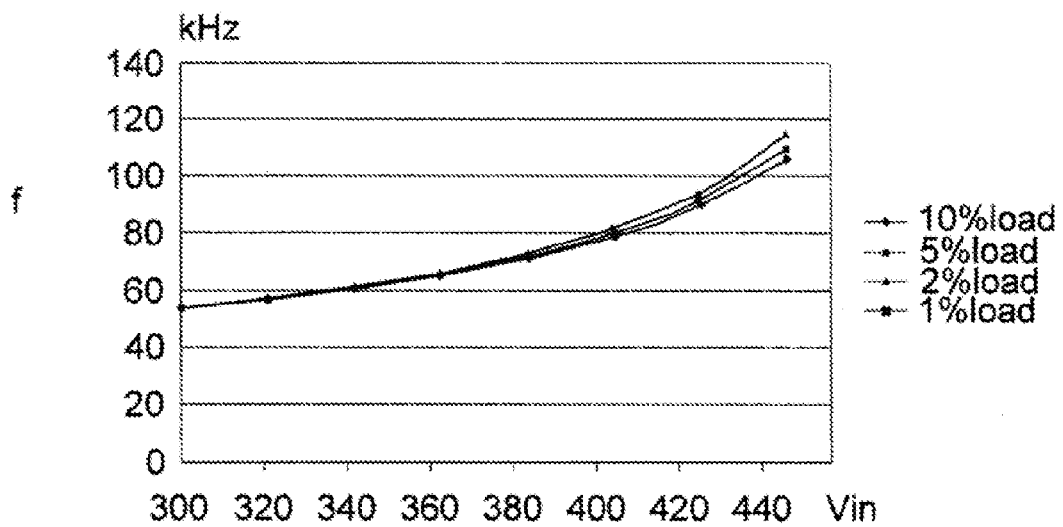
Fig.4A
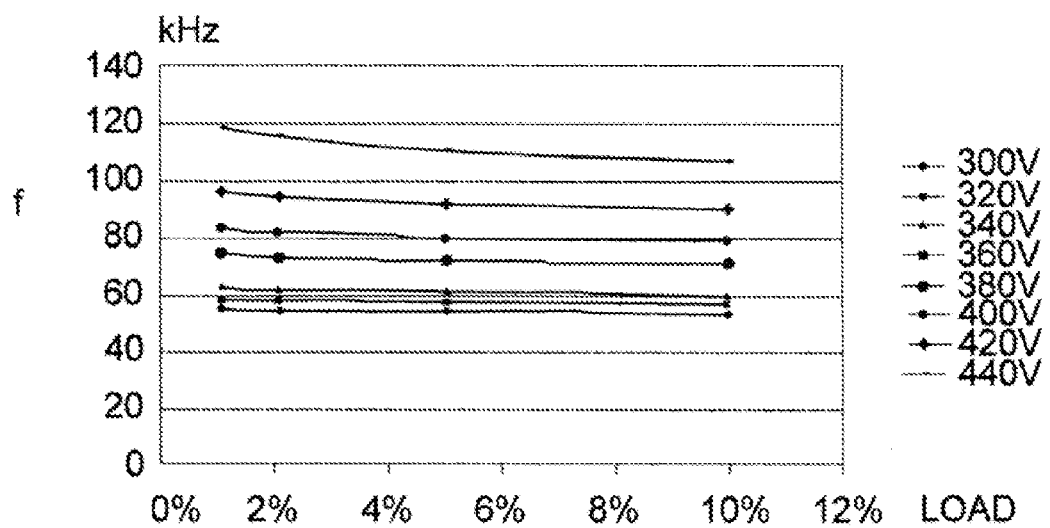
Fig.4B

CONTROL DEVICE FOR A RESONANT CONVERTER

BACKGROUND

1. Technical Field

The present disclosure relates to a control device for a resonant converter.

2. Description of the Related Art

Switching converters with devices used for the control thereof are known in the state of the art. Resonant converters represent a wide range of switching converters and include a resonant circuit playing an active role in determining the input-output power flow. In these converters, a bridge (half-bridge) consisting of four (or two) power switches (typically power MOSFETs) supplied by a DC voltage generates a square wave voltage that is applied to a resonant circuit tuned to a frequency close to the fundamental frequency of said square wave. Thereby, because of the selective features thereof, the resonant circuit mainly responds to the fundamental component and negligibly to the higher order harmonics of the square wave. As a result, the circulating power may be modulated by varying the frequency of the square wave, holding the duty cycle constant at 50%. Moreover, depending on the resonant circuit configuration, the currents and/or voltages associated with the power flow have sinusoidal or piecewise sinusoidal shape.

These voltages are rectified and filtered so as to provide DC power to the load. In offline applications, to comply with safety regulations, the rectification and filtering system supplying the load is coupled with the resonant circuit by means of a transformer providing the isolation between source and load to satisfy the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Among the many types of resonant converters, the so-called LLC resonant converter is widely used, especially in the half-bridge version thereof. The designation LLC comes from the resonant circuit employing two inductors (L) and a capacitor (C); a principle schematic of an LLC resonant converter is shown in FIG. 1. The resonant converter 1 comprises a half-bridge of transistors Q1 and Q2 comprised between the input voltage Vin and ground GND and controlled by a control circuit 3. The common terminal HB between the transistors Q1 and Q2 is connected to a circuit block 2 comprising a series of a capacitor Cr, an inductance Ls and another inductance Lp connected in parallel to a transformer 10 with a center-tap secondary. The two windings of the center-tap secondary of the transformer 10 are connected to the anodes of two diodes D1 and D2 the cathodes of which are both connected to the parallel of a capacitor Cout and a resistance Rout; the output voltage Vout of the resonant converter is across said parallel while the DC output current Iout flows through Rout.

Resonant converters offer considerable advantages as compared to traditional switching converters (not resonant, typically PWM—Pulse Width Modulation—controlled): waveforms without steep edges, low switching losses in the power switches due to the "soft" switchings thereof, high conversion efficiency (>95% is easily reachable), ability to operate at high frequencies, low EMI generation (Electro-Magnetic Interference) and, ultimately, high power density (that is, enabling to build conversion systems capable of handling considerable power level in relatively small space).

As in most DC-DC converters, a closed-loop negative feedback control system keeps the output voltage of the converter constant upon changing the operating conditions, that is the input voltage Vin and/or the output current Iout thereof. This is achieved by comparing a portion of the output voltage with a reference voltage; the difference or error signal between the value provided by the output voltage sensing system (usually, a resistor divider) and the reference value is amplified by an error amplifier the output of which modifies a quantity x within the converter and which the energy carried by the converter during each switching cycle substantially depends on. In resonant converters, such a significant quantity is the switching frequency of the square wave stimulating the resonant circuit.

A desire common to many applications of the switching converters and, therefore, also to those in which resonant converters are used, is of optimizing the conversion efficiency (that is the ratio between the output power and input power) also at low loads and/or minimizing the power drawn from the source when the load is null, to comply with the regulations on energy saving (e.g., EnergyStar, CEC, Eu CoC, etc.).

A technique widely implemented in all switching converters (resonant and not) for optimizing the efficiency at low load and minimizing the power absorbed with zero load is to operate the switching converters in the so-called "burst-mode". In this operation mode, the converter operates intermittently with series of switching cycles (bursts) separated by time intervals in which the converter does not switch. When the load is so low that the switching converter operates in burst mode, the intervals in which the converter does not switch are initially quite short; as the load decreases these intervals get longer: the duration of the bursts decreases and their distance in time increases. Thereby, the average switching frequency is considerably decreased and so are the losses associated with the switching of the parasitic elements of the converter and with the flow of the magnetizing current of the transformer which represent the majority of the losses of power under low or very low load conditions.

In all known embodiments, the entry into such burst mode occurs when the transiting power decreases below a pre-established level. The same feedback control loop controls the succession of the bursts so that the output voltage of the converter always remains under control.

In Pulse-Width-Modulation-controlled (PWM) converters, by virtue of the control methods used, there is a direct relationship between the power level which transits in the converter and the control quantity, hence the burst-mode operation is simply provided by the use of a comparator with hysteresis, in the manner described hereinafter.

When the control variable is less than a pre-established threshold the converter is turned off. Due to the stopping of the energy flow, the output voltage starts to decrease slowly, because the load is low. The feedback loop reacts to this lowering of the output voltage by increasing the control voltage and, when this exceeds the aforesaid threshold by a quantity equal to the hysteresis, the converter turns on again. Due to this, the output voltage increases and, consequently and again due to the feedback loop, the control voltage decreases once more. As soon as said voltage returns below the pre-established threshold the converter is turned off again, and so on.

In all control integrated circuits for resonant DC-DC converters on the market, the control directly operates on the oscillation frequency of the half-bridge (Direct Frequency Control, DFC).

In the control systems for resonant converters the burst-mode operation is implemented in the same mode as in the PWM controllers, that is by comparing the control voltage with a reference in a comparator with hysteresis. FIG. 3 shows a circuit which implements the burst-mode operation of the integrated control circuit L6599 by STMicroelectronics. In this device the switching frequency is determined by a current-controlled oscillator (CCO) adapted to drive the transistors Q1 and Q2 by the signal Drive, which is programmed by means of the resistors R1 (which sets the minimum operating frequency when the current flowing in the phototransistor of the optical coupler is null) and R2 (which determines the frequency at which the device enters in burst mode) which, together with the reference voltage Vr available at the pin, define the charge/discharge current of the timing capacitor C1 connected to the pin CF. When the current derived from the phototransistor TC is such that the voltage on the collector terminal thereof, brought to pin B, is less than the threshold voltage Vh, the output of the comparator CO9 goes high thus inhibiting the oscillator CCO and turning off both the switches Q1 and Q2, thus turning off the half-bridge. When, due to the reaction of the control loop, such a current is decreased so that the voltage at the pin B exceeds the threshold Vh by a quantity equal to the hysteresis of the comparator CO9, the output thereof goes low thus retriggering the oscillator CCO and determining the restart of the transistors Q1 and Q2 and, therefore, of the half-bridge.

In other controllers available on the market such a function is provided in similar way.

Since the controlled quantity is the frequency and in a resonant converter the frequency increases as the load decreases, a converter employing said integrated controller will enter into burst-mode operation when the operating frequency thereof exceeds a prefixed value (programmed by the resistance R2 in FIG. 3).

Unfortunately, the frequency in resonant converters does not only depend on the load but also, and especially, on the input voltage. On the contrary, in a feedback-controlled resonant converter, the switching frequency changes more due to variations of the input voltage than due to load variations. Another problem is that the operating frequency for assigned conditions of input and load voltage may have considerable variations, due to the statistical dispersion of the characteristic parameters of the resonant circuit (Cr, Ls and Lp in FIG. 1) due to their tolerances. The result is that the power level at which the converter operates at the frequency of the burst-mode operation may have considerable variations and a low production repeatability depending on the input voltage variations and the aforementioned parametric dispersion effect. All this is clearly visible in the diagrams in FIGS. 4A and 4B, in which there is shown the dependency of the frequency f (in kHz) on the input voltage Vin for fixed values of the output power Pout, i.e., when the load varies by a percentage from 1 to 10%, in a reference LLC resonant converter (FIG. 4A) and the dependency of the frequency f on the output power Pout i.e., when the load varies by a percentage from 1 to 12%, for fixed values of the input voltage Vin (FIG. 4B), comprised between 300V and 440V, again in a reference LLC resonant converter.

BRIEF SUMMARY

One embodiment of the present disclosure is a control device for a resonant converter which overcomes the aforesaid drawbacks.

One embodiment is a control device of a switching circuit of a resonant converter having a direct current output, said switching circuit comprising at least a half-bridge of at least a first and a second transistor connected between an input voltage and a reference voltage, said half-bridge being adapted to generate a periodic square-wave voltage for driving the resonant circuit of said resonant converter, said periodic square-wave voltage oscillating between a high voltage corresponding to the input voltage and a low voltage corresponding to the reference voltage, said control device comprising generating means adapted to generate a periodic square-wave signal for driving said half-bridge, characterized in that it comprises measuring means adapted to measure the phase-shift between said periodic square-wave signal generated by said generating means and the current flowing through the resonant circuit and adapted to halt said half-bridge when said phase-shift exceeds a phase-shift value.

Preferably said reference voltage is the ground voltage.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which:

FIG. 3 shows a simplified circuit schematic of the implementation of the burst-mode operating mode in commercial device L6599 by STMicroelectronics;

FIG. 4A shows a diagram of the frequency according to the input voltage for fixed values of the output power;

FIG. 4B shows a diagram of the frequency according to the output power for fixed values of the input voltage;

DETAILED DESCRIPTION

Figure 1:
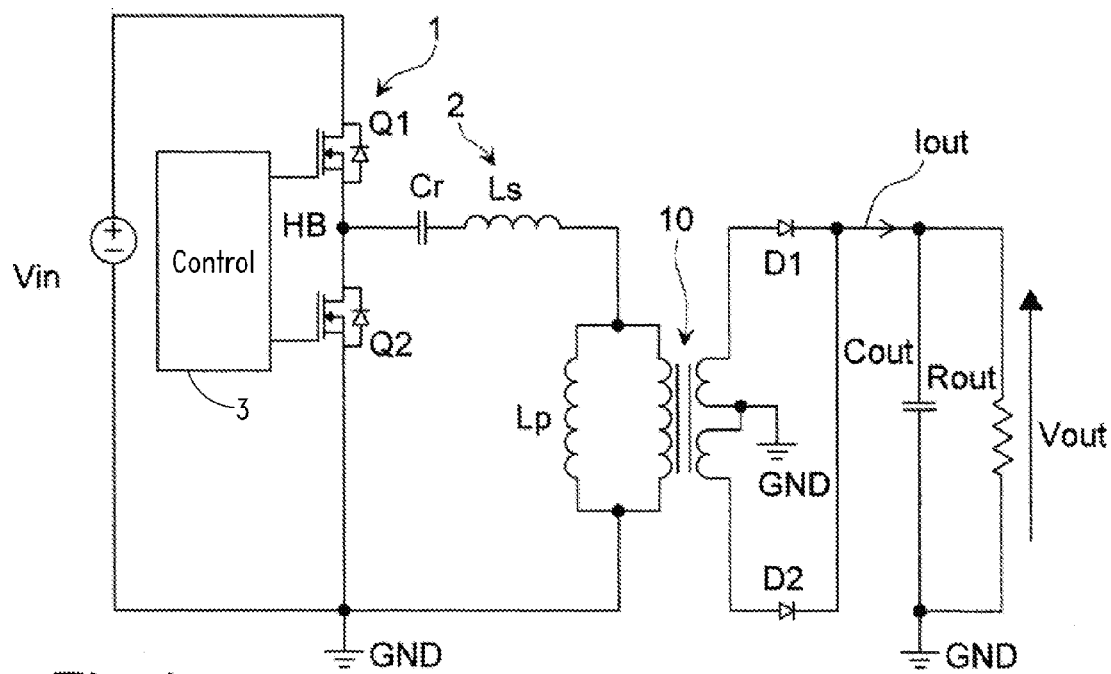
FIG. 1 shows a circuit schematic of an LLC resonant converter in accordance with the known art.
Figure 5A:
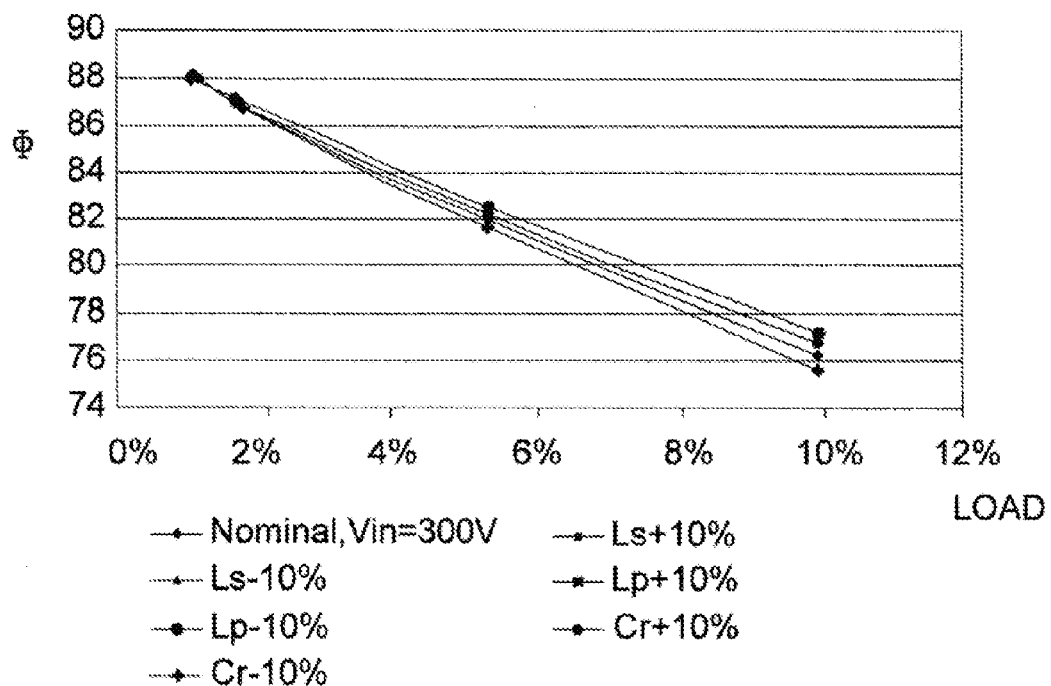
FIG. 5A shows a diagram of the phase-shift according to the percentage variations of the load from 1 to 12% for an input voltage Vin having a nominal value of 300 volts.
Figure 5B:
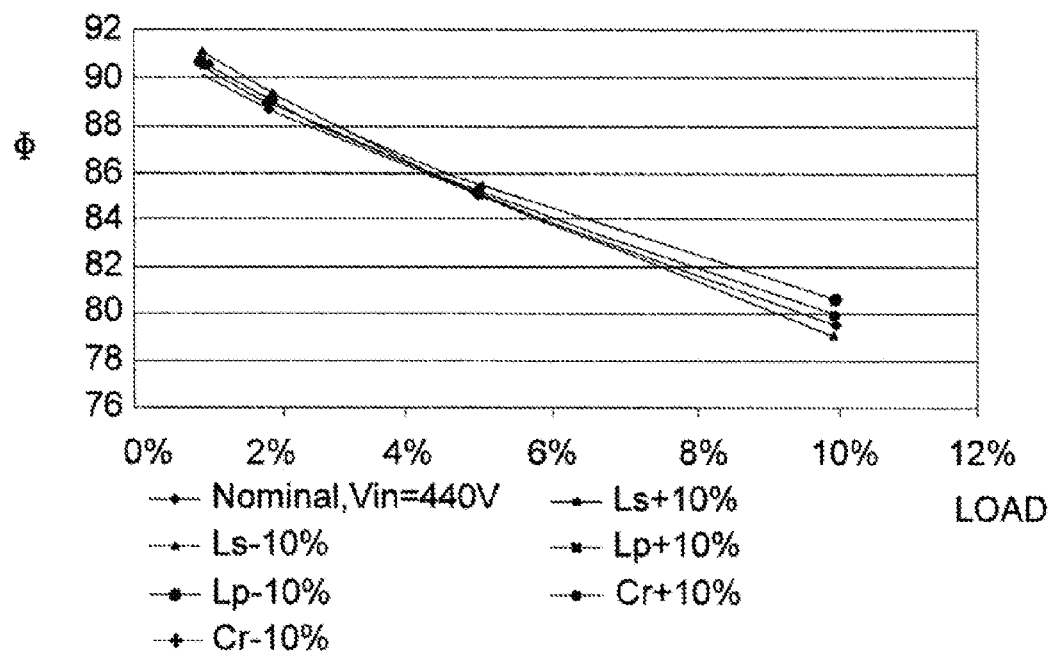
FIG. 5B shows a diagram of the phase-shift according to the percentage variations of the load from 1 to 12% for an input voltage Vin having a nominal value of 440 volts.

With reference to the circuit in FIG. 1, if the load LOAD, comprising the parallel of the capacitor Cout and the resistance Rout, is zero, the current flowing through the diodes D1 and D2 is null hence the secondary windings of the transformer are open. The resonant circuit driven by the half-bridge Q1, Q2 becomes a LC series in which the inductor is given by Ls+Lp. By neglecting the non-idealities, given that the half-bridge switches on a pure reactive load, so that the transferred power is null, the current flowing through the resonant circuit is in quadrature with the square-wave voltage applied (with the current delayed with respect to the voltage, so as to soft-switch the power switches); this does not depend on the value of the input voltage Vin and the value of the characteristic parameters of the resonant circuit. Thus, as confirmed by simulations and by experimental verifications, FIGS. 5A and 5B are diagrams of the phase-shift Φ as a function of the percentage variations of the load from 1 to 12% for an input voltage Vin having nominal values of 300 volts and 440 volts. The value of the voltage-current phase-shift at low loads varies in a rather short interval and has a sensitivity to the variations of the input voltage and/or of the parameters of the resonant circuit, which is considerably lower than what happens to the switching frequency.

The control device for a resonant converter in accordance with one embodiment of the present disclosure allows the converter to enter into the burst mode when the phase exceeds a prefixed value. In one embodiment, the control device comprises a phase-shift detector 200 capable of measuring the phase relationship between a square-wave voltage Vpwm generated for driving the resonant circuit and the current Is which flows therein (phase detector) and of controlling the entry into burst mode of the half-bridge Q1, Q2.

Figure 2:
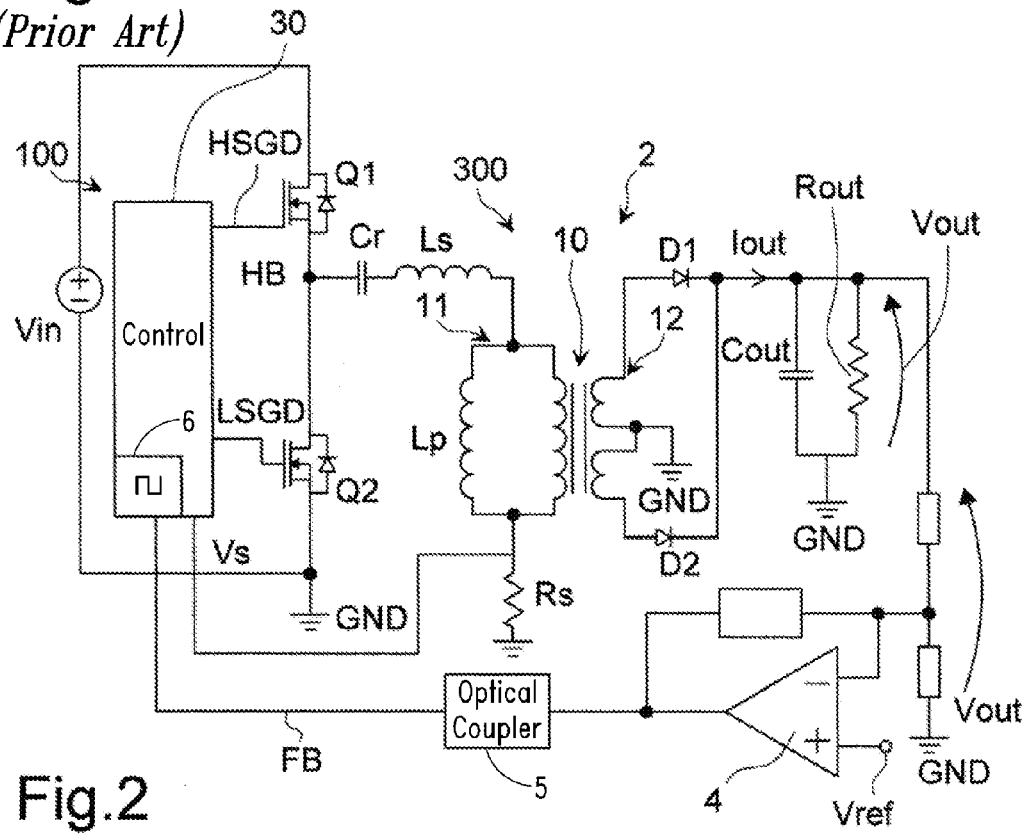
FIG. 2 shows a circuit schematic of a resonant converter with output voltage adjustment in accordance with the present disclosure.

FIG. 2 shows a resonant converter employing a control device 30 in accordance with one embodiment of the present disclosure. The control device 30 controls a switching circuit Q1, Q2 of the resonant converter by means of the signals HSGD and LSGD and the switching circuit Q1, Q2 comprises at least a half-bridge of at least a first Q1 and a second Q2 transistor connected between an input voltage Vin and a reference voltage, preferably ground GND. The half-bridge Q1, Q2 is adapted to generate a periodic square-wave voltage oscillating between a high voltage, corresponding to the input voltage Vin, and a low voltage, corresponding to the reference voltage GND. The half-bridge Q1, Q2 drives a resonant circuit 300, preferably comprising a series of a capacitor Cr and a transformer 10 with a primary 11 and a center-tap secondary 12. The common terminal HB between the transistors Q1 and Q2 is connected to a circuit block 2 comprising the resonant circuit 300. The two windings of the center-tap secondary of the transformer 10 are connected to the anodes of two diodes D1 and D2 whose cathodes are both connected to the parallel circuit that includes a capacitor Cout and a resistance Rout. The output voltage Vout of the resonant converter is across the parallel circuit while the output current Iout flows through Rout.

The resonant converter preferably comprises an error amplifier 4 adapted to compare a part of the output voltage Vout with a reference voltage Vref and output an error signal. The error amplifier 4 has an inverting input terminal that receives a part of the output voltage Vout and a non-inverting input terminal that receives reference voltage Vref. The error signal is transferred to the primary side by an optical coupler 5 that provides a signal FB so as to ensure the primary-secondary isolation according to the safety regulations and acts on a generator 6 of a square-wave signal Vpwm which is inside the control device 30. The periodic square-wave signal Vpwm in turn serves to generate the controlling signals of the half-bridge Q1, Q2, i.e., for the generation of the square-wave voltage applied to the resonant circuit; the square-wave signal generated by the half-bridge Q1, Q2 and applied to the resonant circuit 300 corresponds to the square-wave signal Vpwm generated by the generator 6, unless there are propagation delays. A sense resistance Rs is preferably arranged between the inductance Lp and the ground GND and provides to the control device 30 a voltage Vs based on the current Is of the resonant circuit 300 through Rs. Preferably the signal Vpwm is a signal of PWM type generated according to the signal FB which is representative of the difference between the voltage Vout and the reference voltage Vref.

Preferably the control device 30 is integrated in a chip of semiconductor thus forming a control integrated circuit 100.

Figure 6:
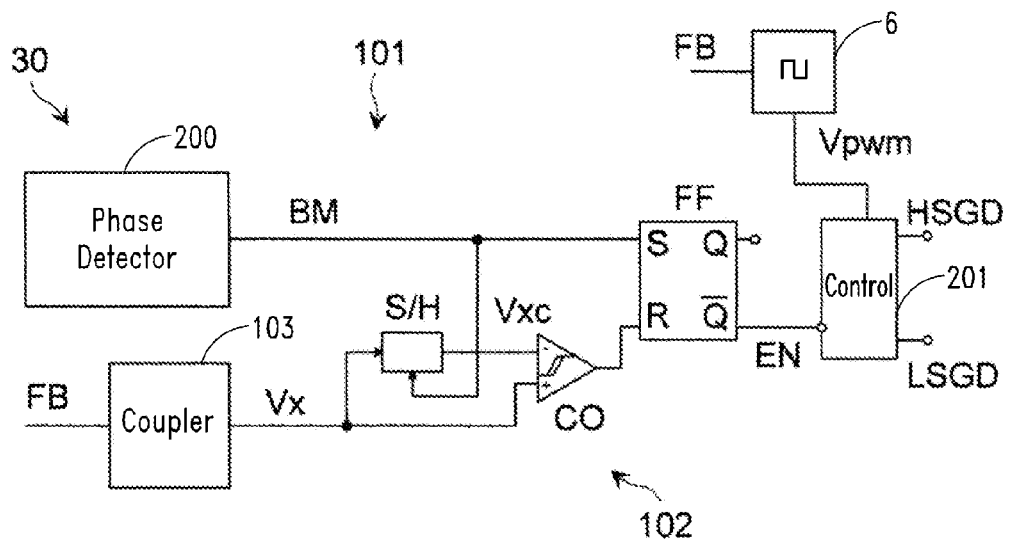
FIG. 6 shows a circuit schematic of a part of the control device for a resonant converter in accordance with the present disclosure.

FIG. 6 illustrates a circuit schematic of a part 101 of the control device 30 for a resonant converter in accordance with one embodiment of the present disclosure. The circuit part 101 comprises a phase detector 200 adapted to detect the condition under which the phase-shift Φ between the current Is of the resonant circuit and the square-wave signal Vpwm—substantially the square-wave voltage generated from the half-bridge Q1, Q2 between the terminal HB and ground GND—exceeds a determinate threshold $\Phi_{th}$, Vth. Consequently, the phase detector is configured to control the half-bridge Q1, Q2 in the burst mode, i.e., to control the non-operating status or the turning off of the half-bridge Q1, Q2.

In particular, as shown in FIG. 6, the output signal BM of the detector 200 is provided to the set input S of a set-reset flip-flop FF that produces at the output $\overline{Q}$ the enabling signal EN for the half-bridge Q1, Q2. In one embodiment, when EN is at logic level 1 the half-bridge is operative while when EN is at logic level 0 the half-bridge Q1, Q2 is not operative. The signal EN is input to a circuit block 201 adapted to emit the signals HSGD and LSGD for controlling the half-bridge Q1, Q2.

The operating (Q1 and Q2 switch in phase opposition) or non-operating (Q1 and Q2 are both kept turned off) condition of the half-bridge (or whole bridge) thus depends on the signal EN, output $\overline{Q}$ of the flip-flop FF. The relationship between the signal EN and the condition of the converter may be inverted, and the circuit modifications of the circuit schematic in FIG. 6 for allowing a correct operation of the system are obvious.

The flip-flop FF is set (thus bringing the signal EN=$\overline{Q}$ to the logic level 0) by the output signal BM of the block 200 which identifies the condition under which the phase-shift Φ between the current Is of the resonant circuit and the square-wave voltage Vpwm between the terminal HB and ground GND exceeds a predetermined threshold $\Phi_{th}$ and produces the signal BM at logic level 1; this determines the turning off of the half-bridge, thus preferably also conditioning it to other signals in the system.

Preferably the part 101 also comprises a circuit 102 adapted to make the half-bridge Q1, Q2 operative again. The circuit 102 comprises a sampler S/H and a device 103 having configured to input the signal FB and produce a signal Vx. The transition of the signal BM from 0 to 1 causes the half-bridge to be turned off and also activates the sampler S/H which records the value of the voltage Vx at that instant and provides a sampled signal Vxc. Such a voltage Vx is directly correlated to the signal FB which allows to modulate the control quantity of the control loop of the output voltage of the converter, by means of a coupled 103. If the signal FB is a voltage, the coupler 103 consists of a simple wire or of a voltage buffer for uncoupling the circuits upstream; if the signal FB is a current, the coupler 103 comprises a current mirror which generates a voltage across a resistance proportional to the same resistance.

A comparator, preferably a hysteresis comparator CO, compares the sampled signal Vxc at the output from the sampler block S/H, with the instantaneous voltage Vx. Due to the turning off of the half-bridge, the output voltage Vout starts to decrease slowly, the feedback loop reacts to this decrease by increasing the signal FB and, therefore, also the signal Vx. When the value of the signal Vx exceeds the sampled value Vxc by a prefixed quantity and in this case equal to the hysteresis of the comparator CO, the output thereof goes to the logic value 1, thus controlling the reset R of the flip-flop FF by bringing the signal EN to the logic level 1 and turning on the half-bridge. Thereby the desired functionality has been obtained by associating the turning on of the half-bridge with the quantity of the control loop of the output voltage, thereby ensuring that this quantity always keeps an average value about the regulation point.

Figure 7:
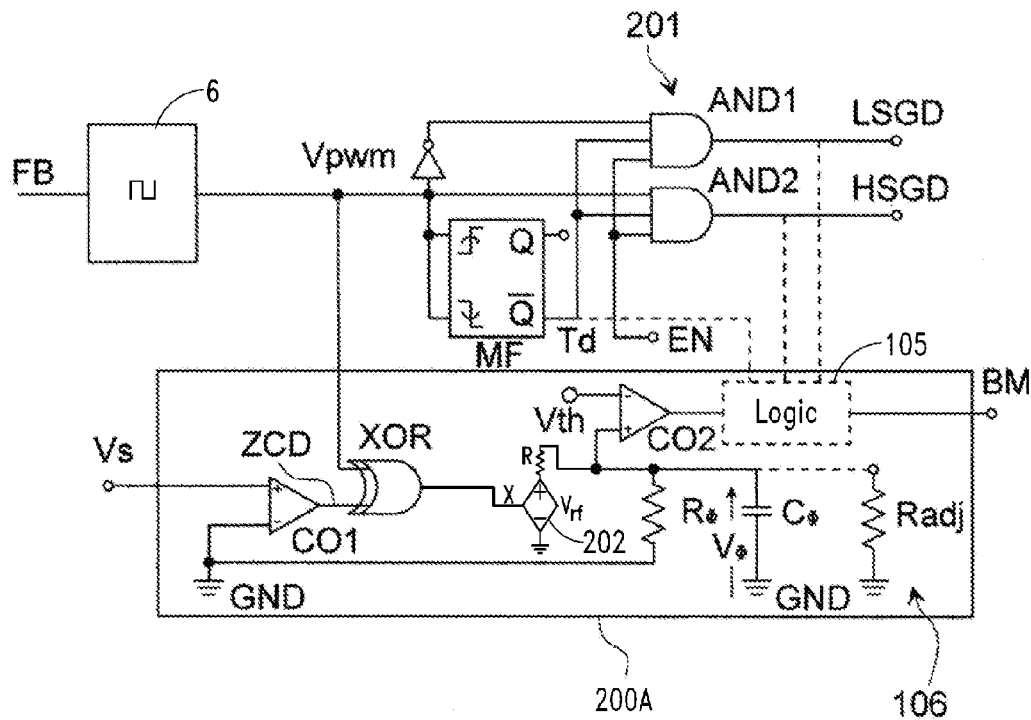
FIG. 7 is a circuit schematic of a control device for a resonant converter in accordance with a first embodiment of the present disclosure.

FIG. 7 shows a possible circuit implementation 200A of the circuit block 200 together with other elements of the control circuit 30. The circuit part external to the circuit block 200A is an example and is shown to note how such a functional block interfaces with the other functional blocks of the controller.

The signal Vs at the non-inverting input of a comparator CO1 is a voltage proportional to the current Is which flows through the resonant circuit and is obtained with any one of the techniques of the known art, for example with a sensing resistance Rs arranged in series to the resonant circuit and having a terminal connected to ground GND.

The comparator CO1 has the inverting input at ground GND, and is in fact a zero detector of the resonant current. The output ZCD of the comparator CO1 is provided to one input of an exclusive OR gate XOR having another input that receives the square-wave signal Vpwm generated by the generator 6. The Vpwm signal is generated as a function of the signal FB which is representative of the difference between the voltage Vout and a reference voltage Vref.

Figure 8:
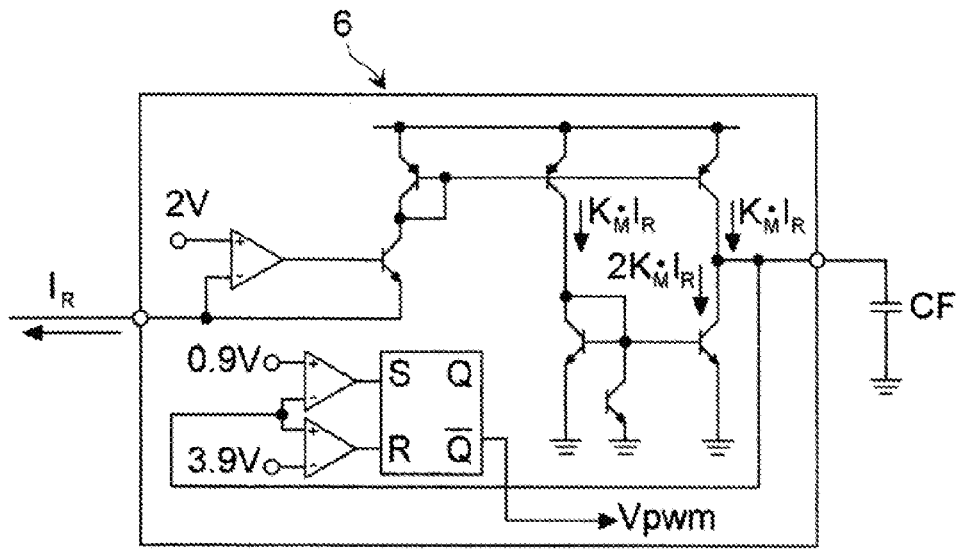
FIG. 8 shows an embodiment according to the known art of a circuit block in FIG. 7.
Figure 9:
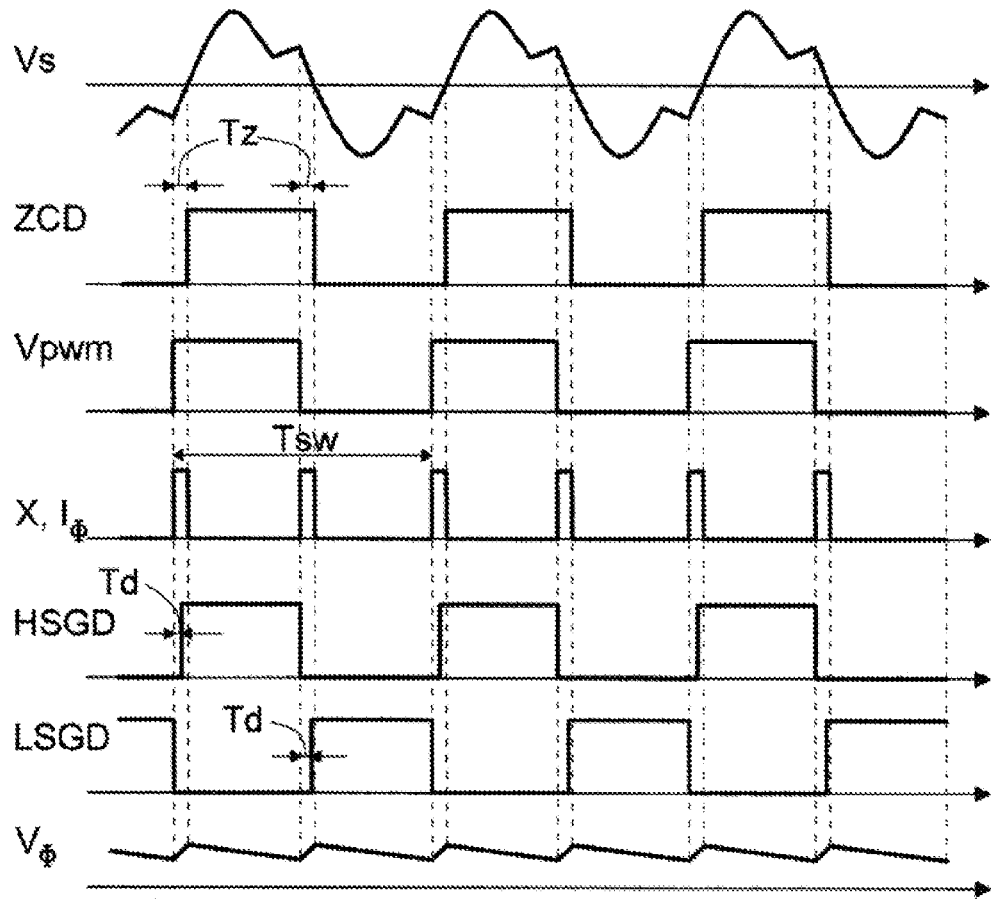
FIG. 9 shows time diagrams of the main waveforms relating to the operation of the circuit in FIG. 7.

The generator 6 is a block known in the state of the art; it is substantially a generator of a series of impulses or square-wave signals and the structure thereof depends on the control method implemented (DFC, CMC, TSC, etc.). An example of internal structure of this block is shown in FIG. 8, where the one included in the commercial device L6599 by STMicroelectronics is shown, which implements a control of DFC type. The circuit block 6 in FIG. 8 has the signal FB at input which is current $I_R$ and comprises an external capacitor CF for generating the square wave Vpwm.

The signal Vpwm is in phase with the signal HSGD which drives the high-side transistor MOSFET Q1 (when HSGD is at the logic level 1, Q1 is on and Q2 is off) and in phase opposition with the signal LSGD which drives the low-side transistor MOSFET Q2 (when LSGD is at the logic level 1 Q2 is on and Q1 is off). Unless there are turn on/turn off delays of the transistors Q1 and Q2, it may therefore be asserted that the signal Vpwm is in phase with the square-wave voltage applied by the half-bridge to the resonant circuit.

The circuit block 201 comprises a monostable circuit MF which, at each transition of the signal Vpwm between 1 and 0 and vice versa, sends a logic signal 0 for a period of time Td to two logic gates of AND type AND1 and AND2 which have at output the signals HSGD and LSGD respectively: during this interval Td, generally short with respect to the duration of the on time periods of the transistors Q1 and Q2, both the transistors Q1 and Q2 are off. The two AND logic gates AND1 and AND2 also have at input the signal EN at output from the set-reset flip-flop FF. The AND gates AND2 and AND1 have at input the signal Vpwm from the generator 6 and the negated one thereof, respectively.

In the regular operation of the resonant half-bridge (the one so-called "inductive" in which the current of the resonant circuit is in phase delay with respect to the voltage), when the signal Vpwm becomes 1, the transistor Q2 turns off (and the transistor Q1 turns on after a delay Td), the current Is of the resonant circuit goes from negative to positive during the course of the startup period of the transistor Q1, and the signal ZCD goes from a low level (usually at ground GND) to a high level (1). Similarly, when the signal Vpwm becomes 0, the transistor Q1 turns off (and the transistor Q2 turns on after a delay Td), the current goes from positive to negative during the startup period of the transistor Q2, and the signal ZCD goes from high (logic level 1) to low (logic level 0). At the beginning of each conduction cycle of the transistors Q1 and Q2, the signals ZCD and Vpwm have conflicting values, and then become in agreement after the zero-crossing by the current Is. Thus the output X of the gate XOR will have logic value 1 for the entire time interval from the turning off of each MOSFET transistor to the successive zero-crossing of the current Is, and takes on the logic value 0 for the entire rest of the conduction period of that MOSFET transistor.

The signal X turns on a current generator 202 which distributes the current $I_\Phi$ when X is at the logic level 1 and current null when X is at the logic level 0.

This generator 202 is typically provided by a voltage reference $V_{rf}$ (which, due to its nature, is very accurate) and a resistance R which, provided in integral form, has a value affected by the temperature and by a considerable statistical dispersion (about ±25%). The result is that the value of $I_\Phi$ has a wide tolerance, substantially determined by the tolerance of the resistance R.

This current $I_\Phi$ is distributed on a parallel consisting of the resistance $R_\Phi$ and of the capacitance $C_\Phi$. The resistance $R_\Phi$ is also performed in integrated form and, with suitable manufacturing contrivances, may be correlated with the resistance R which defines the current $I_\Phi$ so that, although the individual values thereof have a wide tolerance, their ratio $R_\Phi/R$ has a very restricted tolerance (even <1%). Instead the capacitance $C_\Phi$ is an external capacitor because the capacitive values required are incompatible with the integration on silicon.

By supposing that the time constant $R_\Phi \cdot C_\Phi$ is always kept much longer than switching period of the half-bridge Tsw, the voltage which develops across the capacitor $C_\Phi$ has a much greater direct component $V_\Phi$ than the alternating component due to the charge of the current $I_\Phi$ and to its discharge across the resistance $R_\Phi$. The value of the direct component $V_\Phi$ is to be such that the whole charge lost in each switching half-cycle of the half-bridge by means of the resistance $R_\Phi$ equals the charge provided by the generator $I_\Phi$ during the time period Tz when X=1. In the hypothesis of negligible alternating component, it may be thought that the discharge of the capacitor $C_\Phi$ occurs at constant current, hence said the charge balance may be expressed with $$\frac{V_\Phi}{R_\Phi}\frac{Tsw}{2} = I_\Phi Tz$$

from which $$V_\Phi = I_\Phi R_\Phi \frac{T_z}{\frac{Tsw}{2}} = \frac{V_{rf}}{R} R_\Phi \frac{T_z}{\frac{Tsw}{2}}$$

is obtained.

It is noted that the multiplicative term of the ratio $Tz/(Tsw/2)$ depends on the ratio $R_\Phi/R$ which, in respect of that said above, has a very restricted tolerance, and thus substantially has a tolerance equal to that of the reference $V_{ref}$ which also has a low tolerance. It may therefore be asserted that the voltage $V_\Phi$ accurately represents the ratio $Tz/(Tsw/2)$.

As for this latter quantity, considering the phase-shift $\Phi$ of the current Is of the resonant circuit (delayed) with respect to the voltage Vpwm applied thereto, occurs $$T_z: \Phi = \frac{Tsw}{2} : 180°$$

from which $$\frac{T_z}{\frac{Tsw}{2}} = \frac{\Phi}{180°}$$

and $$V_\Phi = I_\Phi R_\Phi \frac{T_z}{\frac{Tsw}{2}} = V_{rf}\frac{R_\Phi}{R}\frac{\Phi}{180°} = k\Phi,$$

i.e., the voltage $V_\Phi$ is proportional to the current/voltage phase-shift of the resonant circuit. It is then possible to provide the functionality wanted, i.e., ensure that the converter enters into the burst mode when the phase exceeds a prefixed value by simply comparing the voltage $V_\Phi$ with a reference $V_{th}$ and generating the signal BM which determines the stopping of the half-bridge when $V_\Phi > V_{th}$. This is precisely as the comparator CO2 operates.

Figure 10:
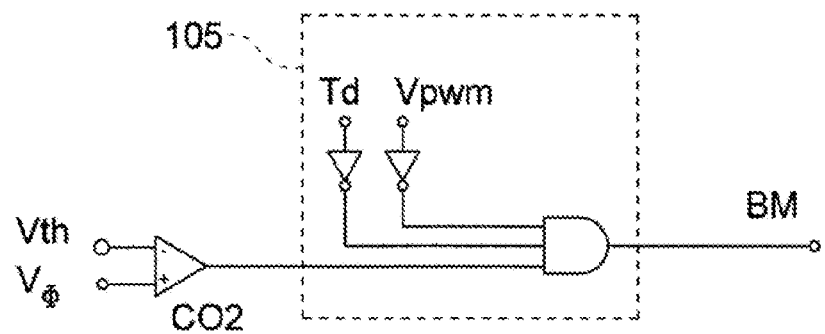
FIG. 10 shows an embodiment of another circuit block in FIG. 7.

Preferably, the phase-shift detector 200A includes a logic circuit 105, better shown in FIG. 10, which receives the output of the comparator CO2 and sends the signal BM which sets the flip-flop FF of the circuit in FIG. 6. The logic circuit 105 comprises a first NOT gate having the signal Td at input and a second NOT gate having the signal Vpwm at input; the circuit 105 also comprises an AND gate having at input the output signals of the two aforesaid NOT gates and the output signal from the comparator CO2 to synchronize the turning off of the half-bridge with the switchings thereof, in this case the turning off of the half-bridge occurs at the end of the conduction period of the transistor Q1.

The intervention threshold value of the circuit in FIG. 7, as phase value, is given by $$\Phi_{th} = \frac{V_{th}}{V_{rf}}\frac{R}{R_\Phi}180°$$

and is therefore fixed internally. It is noted that, if the voltages $V_{rf}$ and $V_{th}$ are also obtained starting from a same generator, the ratio thereof has a very restricted tolerance, therefore the threshold value $\Phi_{th}$ is extremely accurate.

Preferably the circuit 200A comprises a threshold modifier 106 adapted to modify (in particular to increase) the value of said threshold $\Phi_{th}$, said threshold modifier 106 is for example provided by a calibration resistance $R_{adj}$ connected in parallel to the capacitor $C_\Phi$.

The resulting threshold will be:

$$\Phi_{th\_adj} = \frac{V_{th}}{V_{rf}}\frac{R(R_\Phi + R_{adj})}{R_\Phi R_{adj}}180° = \Phi_{th}\frac{1+\frac{R_{adj}}{R_\Phi}}{\frac{R_{adj}}{R_\Phi}}$$

whereby the ratio $R_{adj}/R_\Phi$ will be selected according to the formula $$\frac{R_{adj}}{R_\Phi} = \frac{1}{\frac{\Phi_{th\_adj}}{\Phi_{th}} - 1}.$$

The addition of the resistance $R_{adj}$, which is uncorrelated with the internal resistances, worsens the accuracy level of the threshold $\Phi_{th\_adj}$ given that the statistical variations of the resistance $R_\Phi$ will no longer almost be exactly compensated by the ones of the resistance R, which are proportional to the first, and therefore the tolerance of the resistance $R_\Phi$ will affect the one of the threshold $\Phi_{th\_adj}$. It is possible to express this fact by defining the factor $\Lambda$ intended as ratio between the tolerance of the ratio $\Phi_{th\_adj}/\Phi_{th}$ and the one of the resistance $R_\Phi$. It is demonstrated that this ratio may be expressed as $$\Lambda = \frac{1}{1+\frac{R_{adj}}{R_\Phi}} = \frac{\frac{\Phi_{th\_adj}}{\Phi_{th}} - 1}{\frac{\Phi_{th\_adj}}{\Phi_{th}}}.$$

Figure 11:
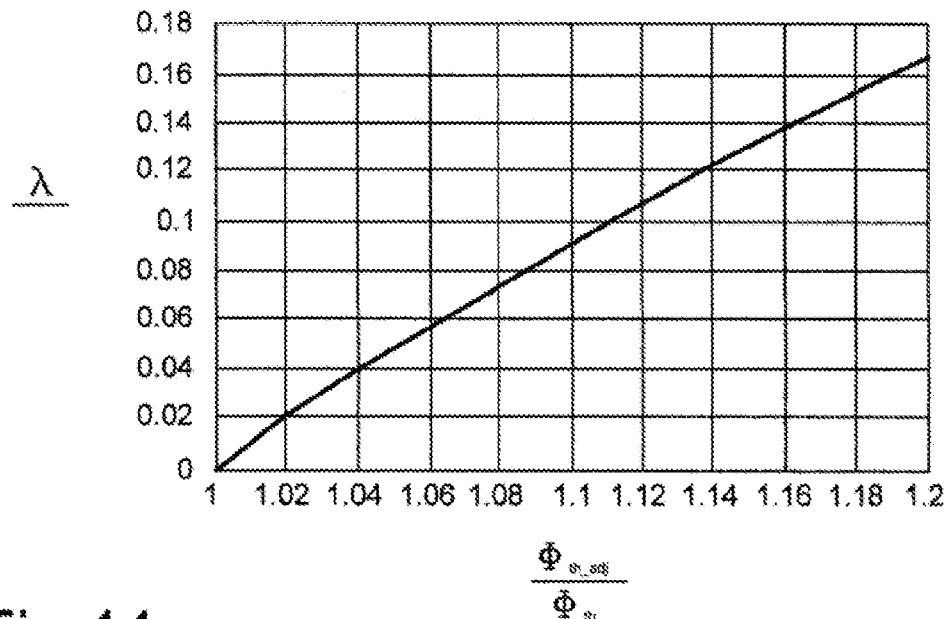
FIG. 11 shows a diagram which illustrates the relationship between the tolerance of the stopping threshold and the one of the resistance $R_\Phi$ if the external calibration resistance Radj is used, with reference to the circuit in FIG. 7.

The diagram of $\Lambda$ according to the ratio $\Phi_{th\_adj}/\Phi_{th}$ is shown in FIG. 11. An interval of values is considered of $\Phi_{th\_adj}/\Phi_{th}$ from 1 to 1.2 (sufficient to cover the practical cases involved). Indeed, it should be $\Phi_{th\_adj} \leq 90°$ and this means considering an interval of values of $\Phi_{th\_adj}$ starting from $\Phi_{th}=75°$, which is a sensible value, corresponding to load values of about 10-15% of the nominal load. For $\Phi_{th\_adj}/\Phi_{th}=1.2$ is $\Lambda=0.167$ and therefore there is a possible range of variation for $\Phi_{th\_adj}/\Phi_{th}$ which is not greater than ±4.2%. In a practical case involved, by changing the threshold of intervention from 75° to 80°, the result is $\Lambda=0.0625$ and therefore an increase of 1.56% of the tolerance of $\Phi_{th\_adj}/\Phi_{th}$.

The ratio between the tolerance of the ratio $\Phi_{th\_adj}/\Phi_{th}$ and the one of $R_{adj}$ is also equal to $\Lambda$. However, given that the tolerance of $R_{adj}$ is very low (1% is easily obtainable at low cost), the effect thereof is negligible on the ratio $\Phi_{th\_adj}/\Phi_{th}$.

When the half-bridge is non-operative between one turning off and the other (EN=0) the generator $I_\Phi$ remains off and the voltage $V_\Phi$ falls to zero with the time constant $R_\Phi \cdot C_\Phi$. When the half-bridge turns on (EN=1) a certain time will elapse before the voltage $V_\Phi$ goes to steady state by returning to being proportional to the phase $\Phi$. This, under conditions of very low or null load, may include an excessive number of switching cycles, thus negatively impacting the standby consumption of the converter. Preferably the control device comprises a discharge preventer 109 adapted to prevent the discharge of the capacitor $C_\Phi$ below a certain level Vtol in the time interval between one burst and the other.

Figure 12:
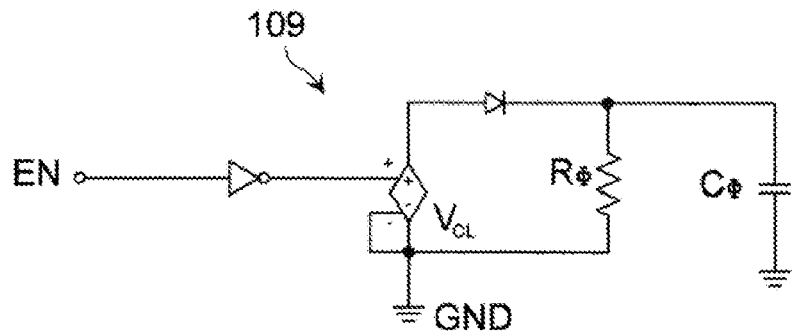
FIG. 12 is a circuit schematic of a circuit suitable for limiting the voltage across the capacitor $C_\Phi$ in the time intervals between two consecutive stops.

Said discharge preventer 109 may comprise a limiting voltage generator $V_{CL}$, with $V_{CL} < V_{th}$, connected in parallel to the capacitor $C_\Phi$ only when EN=0 and disconnected when EN=1, as shown in FIG. 12.

Figure 13:
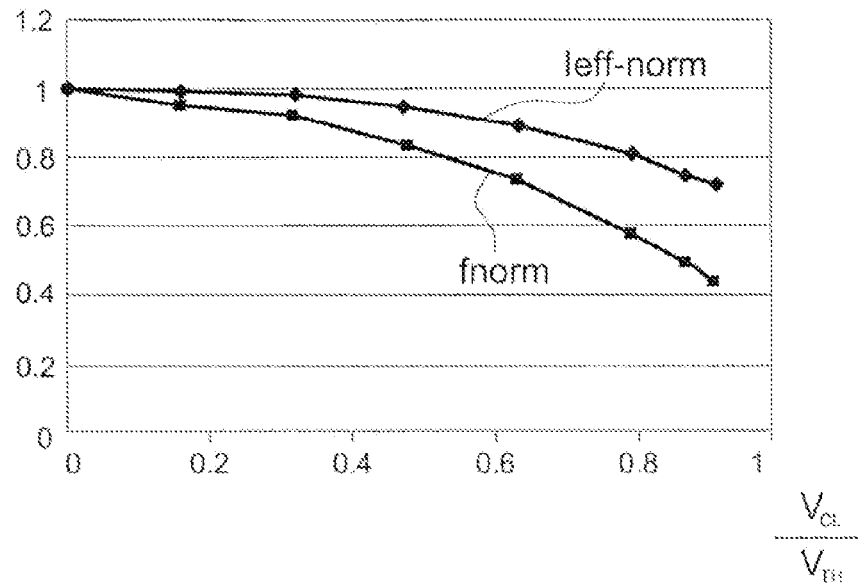
FIG. 13 is a diagram of the limitation voltage as a function of the performances of the converter operating in burst mode which are measured in terms of effective current value in the resonant circuit and of average switching frequency for assigned operating conditions.

The diagrams in FIG. 13 show the effect of the limiting voltage $V_{CL}$ on the burst mode performances in, assessed by means of simulations in the reference converter considered previously, with a load equal to 1% of the nominal load.

The root-mean-square value of the resonant current Ieff-norm (indicative of the residual conductive losses) and the switching frequency fnorm (indicative of the switching loses in the transistors MOSFET and of the losses in the resonant transformer), both normalized to the respective values with $V_{CL}$=0, according to the ratio $V_{CL}/V_{th}$ are indicated. Simulations performed under different load conditions (5%, 0.25%) show the same tendency. It may be deduced from the diagram that the ratio $V_{CL}/V_{th}$ is to be kept close to 1.

Figure 14:
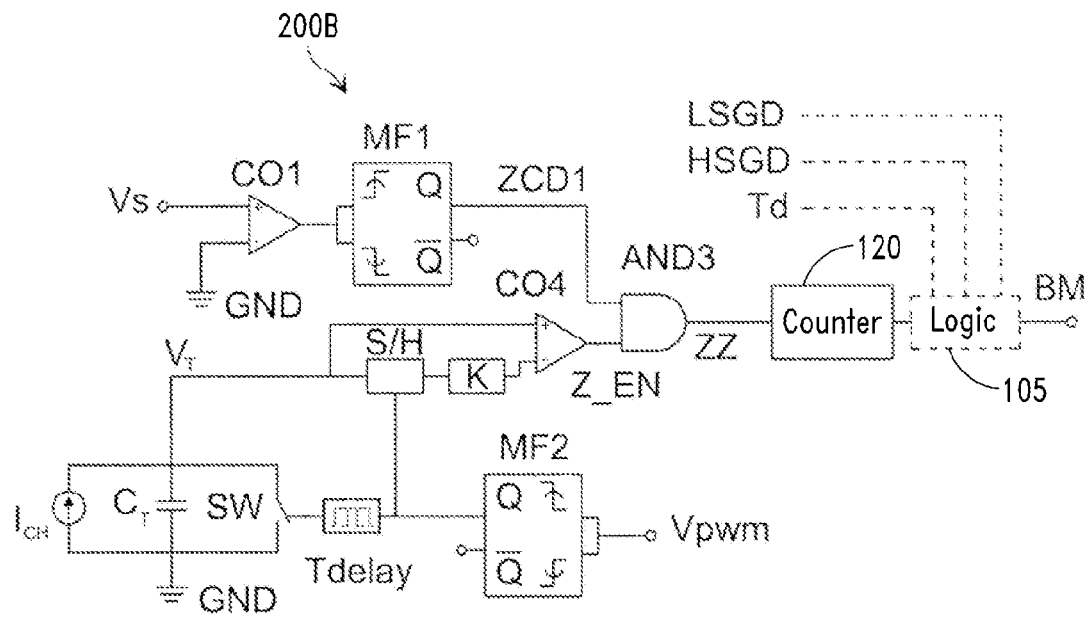
FIG. 14 is a circuit schematic of a control device for a resonant converter in accordance with a second embodiment of the present disclosure.

FIG. 14 shows a control device for a resonant converter in accordance with a second embodiment. The control device of said second embodiment differs from the control device of the first embodiment in that the control device of said second embodiment different phase detector 200B.

Like the circuit in FIG. 7, the signal Vs brought at the non-inverting input of the comparator CO1 is a voltage proportional to the current Is flowing through the resonant circuit, and is obtained with any one of the techniques of the known art. For example, the signal Vs can be obtained with a sensing resistance Rs arranged in series between the resonant circuit and ground GND, in particular between the inductance Ls and ground GND. The comparator CO1, having the inverting input arranged at ground GND, acts as zero detector of the resonant current Is. A monostable circuit MF1, sensitive to both positive and negative edges, receives the output signal of the comparator CO1 and outputs a short impulse ZCD1 of prefixed duration (e.g., of 100 ns) each time the output of the comparator CO1 has a transition, i.e., at each zero crossing at the resonant current Is. These impulses are sent to the input of an AND gate AND3 which, at the other input, receives a signal Z_EN at output from a comparator CO4. A linear-ramp voltage $V_T$, obtained by charging a capacitor $C_T$ with a current generator $I_{CH}$ when a switch SW is open, is applied at the non-inverting input of the comparator CO4. The current generator $I_{CH}$, the capacitor $C_T$ and the switch SW are arranged in parallel and have a common terminal connected to ground GND. The switch SW is controlled, through a delay line Tdelay, by an output of a monostable circuit MF2, which is sensitive to both positive and negative edges, and outputs a short impulse of prefixed duration (e.g., of 200 ns, sufficient to completely discharge the capacitor $C_T$ by means of the parasitic resistance of the switch SW) each time that the signal Vpwm changes status, that is at each switching of the half-bridge Q1, Q2.

Thereby, the peak value of the voltage $V_T$ is put in relation with the duration of each signal level Vpwm and therefore, with the duration of the switching half-period Tsw/2 of the half-bridge. The output signal of the monostable circuit MF2 is sent to the sampler circuit S/H which stores the voltage $V_T$ value in the exact switching instant of the half-bridge Q1, Q2, and also resets the ramp voltage $V_T$ with a delay Tdelay to prevent sampling errors. A direct voltage proportional to Tsw/2 given by $$V_{T\_pk} = \frac{I_{CH}}{C_T} \frac{Tsw}{2}$$

is at the output of said sampler. This voltage is brought to a gain attenuator block K (with K<0.5) and then to the inverting input of the comparator CO4. The signal Z_EN in each switching half-cycle has a logic level 0 as long as the voltage $V_T$ is less than a value K of the voltage $V_{T\_pk}$ sampled in the previous half-cycle, and a logic level 1 when the voltage $V_T$ exceeds the value K of the voltage $V_{T\_pk}$ sampled in the previous half-cycle and up to the end of the current half-cycle.

Thereby, if the impulse ZCD1 occurs before a value K of the half-cycle (measured in the previous half-cycle), i.e., K=Ts/Tsw/2, is passed with Z_EN=0, it is blocked by the AND gate AND3. If instead the impulse ZCD1 occurs after the value K of the half-cycle (measured in the previous half-cycle) is passed with Z_EN=1, it is transmitted to the output of the AND gate AND3 as impulse ZZ. Considering that $$\frac{T_z}{\frac{Tsw}{2}} = K = \frac{\Phi}{180°},$$

this latter condition corresponds to the fact that the phase $\Phi$ of the current Is of the resonant circuit is greater than the prefixed phase $\Phi_{th}$=K·180°, if the duration of the two consecutive half-cycles changes negligibly.

To prevent the signal BM from being inappropriately activated by noise or also in the presence of very short load transistors, the condition may be provided that $\Phi > \Phi_{th}$ is to be confirmed for N cycles before the signal BM becomes equal to 1. This is provided by a counter 120 of the pulses ZZ. The choice of the value N is a trade-off: on the one hand N should be great enough to have immunity to the disturbances and confirm that the current phase is effectively greater than the threshold value; on the other hand, N should not be too great otherwise too many switching cycles would be included in each burst which could lead to a relatively high average operating frequency, thus negatively impacting the standby consumption of the converter. A reasonable choice could be N=4.

Again in the case being considered, it is possible that the output of the counter passes through a logic circuit 105 similar to the one shown in FIG. 10 to generate the signal BM, so as to synchronize the turning off of the half-bridge with the switchings thereof.

Figure 15:
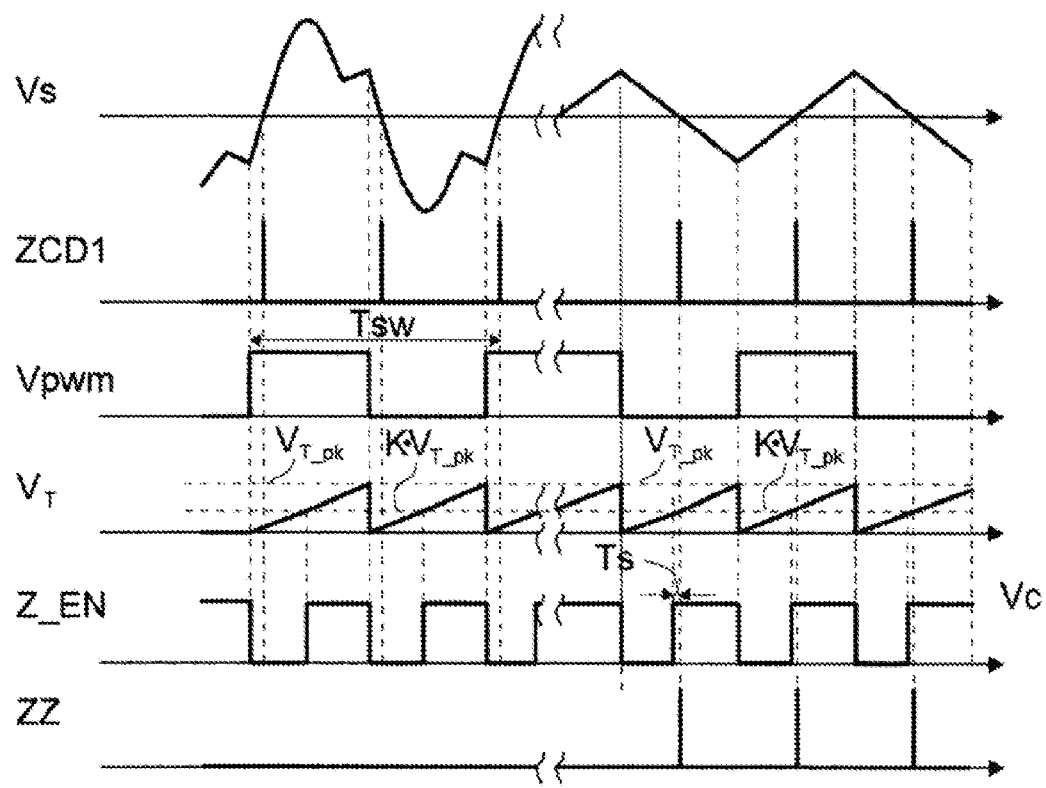
FIG. 15 shows time diagrams of the main waveforms relating to the operation of the circuit in FIG. 14.

FIG. 15 shows the signals involved in the circuit 200B implemented in FIG. 14.

Figure 16:
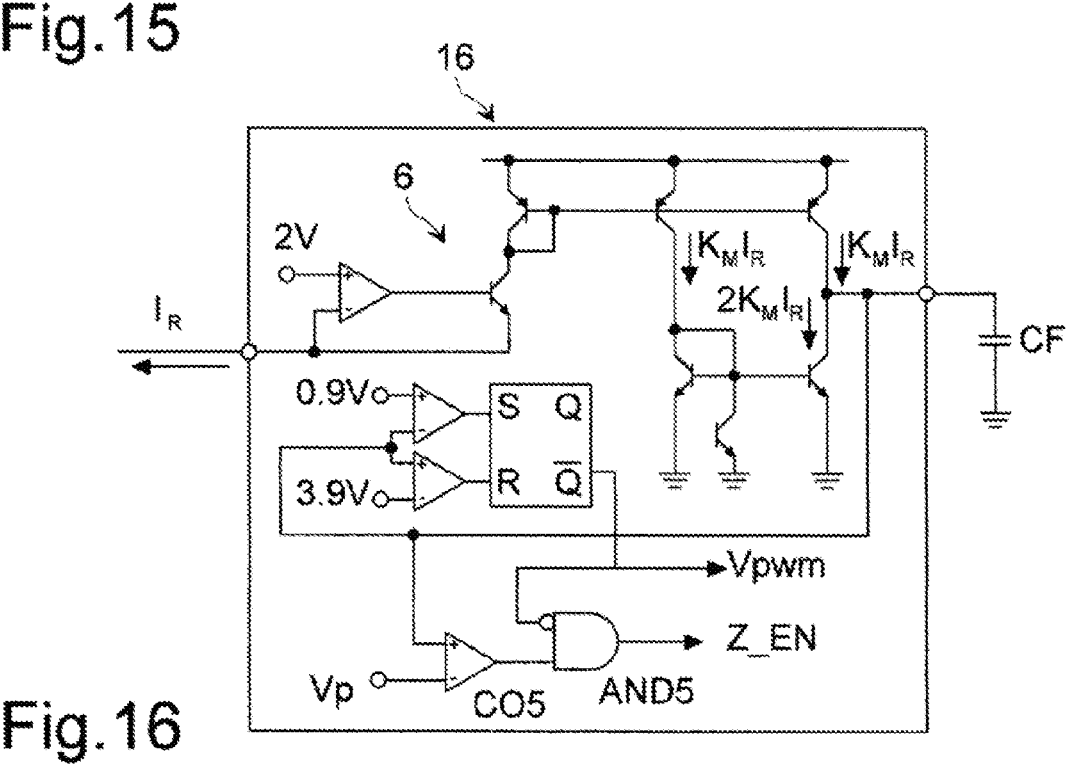
FIG. 16 shows a possible simplification of a part of the circuit in FIG. 14 makeable in case of device which employs the circuit shown in FIG. 8.

If an impulse generator block 6 is implemented like the one shown in FIG. 8, the circuit in FIG. 14 may be simplified by removing the ramp voltage generator $V_T$ and the sampler S/H. FIG. 16 shows an impulse generator 16 which comprises the impulse generator 6 in FIG. 8, modified with the addition of a comparator CO5 adapted to compare the voltage ramp across the external timing capacitor CF with a reference Vp conveniently selected (0.9V<Vp<2.4V, so that K<0.5) so as to define the time window Z_EN=1 only during the half-cycles in which PWM=0 (by means of the gate AND5 having at the input the output signal of the capacitor CO5 and the negated signal Vpwm) in which, i.e., the result is a rising ramp across the capacitor CF.

The modifications to said circuit to use the falling ramp across the capacitor CF rather than the rising one or to use them both like in the case of the circuit in FIG. 14, are considered obvious and are not described herein in detail. The same may be said for the possible modifications to the other circuits described previously so as not to substantially modify the operation thereof such as, for example, changing the operation periodicity thereof from the switching half-cycle to the cycle or vice versa.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching circuit, including a bridge, of a resonant converter having a resonant circuit, said control device comprising:
   a square wave generator configured to generate a periodic square-wave signal for controlling said bridge;
   a phase-shift detector configured to detect a phase-shift between said periodic square-wave signal and a current flowing through the resonant circuit and configured to output a halt signal in response to detecting that said phase-shift exceeds a first phase-shift value;
   a controller configured to receive the halt signal and temporarily halt the bridge by temporarily preventing the periodic square-wave signal from reaching the bridge, in response to receiving the halt signal, wherein the controller is configured to make said bridge operative again after the bridge is temporarily halted under control of the halt signal from the phase-shift detector;
   a sampler configured to receive a first signal representative of a difference between an output voltage from the resonant converter and a reference voltage and configured to provide a second signal based on a sampling of the first signal; and
   a comparator configured to compare said first and second signals and to send an activation signal when the first signal exceeds the second signal by a prefixed quantity, wherein the controller is configured to activate the bridge in response to the activation signal.

2. The device according to claim 1, wherein said comparator is a hysteresis comparator and said prefixed quantity is a hysteresis value of said comparator.

3. The device according to claim 1, comprising a delay element configured to delay the periodic square-wave signal generated by said square-wave generator.

4. The device according to claim 1, wherein said first phase-shift value is a prefixed value.

5. The device according to claim 1, wherein the device is integrated in a silicon chip.

6. A control device for controlling a switching circuit, including a bridge, of a resonant converter having a resonant circuit, said control device comprising:
   a square wave generator configured to generate a periodic square-wave signal for controlling said bridge; and
   a phase-shift detector configured to detect a phase-shift between said periodic square-wave signal and a current flowing through the resonant circuit and configured to halt said bridge in response to detecting that said phase-shift exceeds a first phase-shift value, wherein said phase-shift detector includes:
   a voltage generator configured to provide a voltage signal representative of said phase shift and having a value which is a function of a time period between reaching a high voltage value of said square-wave signal and a zero-crossing of said current flowing through the resonant circuit, or between reaching a low voltage value of said square-wave signal and the zero-crossing of said current flowing through the resonant circuit; and
   a comparator configured to compare the voltage signal with a voltage value representative of the first phase-shift value.

7. The device according to claim 6, wherein said voltage generator includes:
   a zero crossing detector configured to detect the zero-crossing of said current through the resonant circuit and provide a zero-crossing signal;
   an exclusive OR gate configured to input said periodic square-wave signal and the zero-crossing signal and provide an output signal only having a high logic level for said time period between reaching the high voltage value of said square-wave voltage and the zero-crossing of said current flowing through the resonant circuit, or between reaching the low voltage value of said square-wave signal and the zero-crossing of said current; the voltage generator being configured to generate said voltage signal only when said output signal of the exclusive OR gate is at the high logic level.

8. The device according to claim 7, wherein said voltage generator includes a capacitor across which the voltage signal is generated, said control device comprising a discharge preventer configured to prevent discharging said capacitor below a certain level during a time interval while the bridge is halted.

9. A control device for controlling a switching circuit, including a bridge, of a resonant converter having a resonant circuit, said control device comprising:
   a square wave generator configured to generate a periodic square-wave signal for controlling said bridge; and
   a phase-shift detector configured to detect a phase-shift between said periodic square-wave signal and a current flowing through the resonant circuit and configured to halt said bridge in response to detecting that said phase-shift exceeds a first phase-shift value, wherein said phase-shift detector includes:
   a first comparator having first and second inputs, the first input configured to receive a first signal which is representative of the current flowing through said resonant circuit and the second input being coupled to ground, the first comparator being configured to provide a first output signal based on detecting zero-crossings of said first signal;
   a monostable circuit configured to receive the output signal from said first comparator and to output a first impulse of prefixed duration in response to each time that the first output signal from the first comparator has a transition;
   a ramp generator configured to generate a ramp voltage according to transitions of said square-wave signal;
   a second comparator configured to compare said ramp voltage with a direct voltage proportional to a switching half-cycle of the bridge and provide a second output signal; and a logic element configured to emit respective second impulses in response to respective times that the second output signal of the second comparator and the first impulse output from the monostable circuit both have a high value.

10. The device according to claim 9, wherein the phase-shift detector includes a counter configured to count the second impulses output by said logic element and to halt the bridge when a number of said second impulses exceeds a prefixed value.

11. A control device for controlling a switching circuit, including a bridge, of a resonant converter having a resonant circuit, said control device comprising:
a square wave generator configured to generate a periodic square-wave signal for controlling said bridge; and
a phase-shift detector configured to detect a phase-shift between said periodic square-wave signal and a current flowing through the resonant circuit and configured to halt said bridge in response to detecting that said phase-shift exceeds a first phase-shift value, wherein said phase-shift detector includes:
a first comparator having first and second inputs, the first input being configured to receive a first signal which is representative of the current flowing through said resonant circuit and the second input being coupled to ground, the first comparator being configured to provide a first output signal based on detecting zero-crossings of said first signal;
a monostable circuit configured to receive the first output signal of said first comparator and to output a first impulse of prefixed duration in response to each time that the first output signal of the first comparator has a transition;
a ramp generator configured to generate a ramp voltage correlated with transitions of said square-wave signal;
a second comparator configured to compare said ramp voltage with a reference voltage and provide a second output signal;
a first logic element to issue a third output signal at a selected logic value in response to the second output signal of the second comparator and a negated version of said square-wave signal having respective logic values that are equal; and
a second logic element configured to output respective second impulses in response to respective times that the third output signal of said first logic element and the first output signal from the first comparator both have the selected logic value.

12. The device according to claim 11, wherein the phase-shift detector includes a counter configured to count the second impulses output by said second logic element and to halt the bridge when a number of said second impulses exceeds a prefixed value.

13. The device according to claim 11, comprising a third logic element configured to control the turning off of the bridge in response to each second impulse output by the second logic element.

14. A resonant converter, comprising:
a resonant circuit;
a switching circuit that includes a bridge having first and second transistors, said bridge being configured to drive the resonant circuit; and
a control device configured to control the switching circuit, the control device including:
a square wave generator configured to generate a periodic square-wave signal for controlling said bridge; and
a phase-shift detector configured to detect a phase-shift between said periodic square-wave signal and a current flowing through the resonant circuit and configured to output a halt signal in response to detecting that said phase-shift exceeds a first phase-shift value;
a controller configured to receive the halt signal and temporarily halt the bridge by temporarily preventing the periodic square-wave signal from reaching the bridge, in response to receiving the halt signal, wherein the controller is configured to make said bridge operative again after the bridge is temporarily halted under control of the halt signal from phase-shift detector;
a sampler configured to receive a first signal representative of a difference between an output voltage from the resonant converter and a reference voltage and configured to provide a second signal based on a sampling of the first signal; and
a comparator configured to compare said first and second signals and to send an activation signal to the controller, the controller being configured to activate the bridge in response to the activation signal.

15. The resonant converter according to claim 14, wherein said comparator is a hysteresis comparator and said prefixed quantity is a hysteresis value of said comparator.

16. A resonant converter, comprising:
a resonant circuit;
a switching circuit that includes a bridge having first and second transistors, said bridge being configured to drive the resonant circuit; and
a control device configured to control the switching circuit, the control device including:
a square wave generator configured to generate a periodic square-wave signal for controlling said bridge; and
a phase-shift detector configured to detect a phase-shift between said periodic square-wave signal and a current flowing through the resonant circuit and configured to halt the bridge in response to detecting that said phase-shift exceeds a first phase-shift value, wherein said phase-shift detector includes:
a voltage generator configured to provide a voltage signal representative of said phase shift and having a value which is a function of a time period between reaching of high voltage value of said square-wave signal and a zero-crossing of said current flowing through the resonant circuit, or between reaching of a low voltage value of said square-wave signal and the zero-crossing of said current flowing through the resonant circuit; and
a comparator configured to compare the voltage signal with a voltage value representative of the first phase-shift value.

17. The resonant converter according to claim 16, wherein said voltage generator includes:
a zero crossing detector configured to detect the zero-crossing of said current through the resonant circuit and provide a zero-crossing signal;
an exclusive OR gate configured to input said periodic square-wave signal and the zero-crossing signal and provide an output signal only having a high logic level for said time period between reaching the high voltage value of said square-wave voltage and the zero-crossing of said current flowing through the resonant circuit, or between reaching the low voltage value of said square-wave signal and the zero-crossing of said current; the voltage generator being configured to generate said voltage signal only when said output signal of the exclusive OR gate is at the high logic level.

18. The resonant converter according to claim 17, wherein said voltage generator includes a capacitor across which the voltage signal is generated, said control device comprising a discharge preventer configured to prevent discharging said capacitor below a certain level during a time interval while the bridge is halted.

19. A resonant converter, comprising:
a resonant circuit;
a switching circuit that includes a bridge having first and second transistors, said bridge being configured to drive the resonant circuit; and
a control device configured to control the switching circuit, the control device including:
a square wave generator configured to generate a periodic square-wave signal for controlling said bridge; and
a phase-shift detector configured to detect a phase-shift between said periodic square-wave signal and a current flowing through the resonant circuit and configured to halt the bridge in response to detecting that said phase-shift exceeds a first phase-shift value, wherein said phase-shift detector includes:
a first comparator having first and second inputs, the first input configured to receive a first signal which is representative of the current flowing through said resonant circuit and the second input being coupled to ground, the first comparator being configured to provide a first output signal based on detecting zero-crossings of said first signal;
a monostable circuit configured to receive the first output signal from said first comparator and to output a first impulse of prefixed duration in response to each time that the first output signal from the first comparator has a transition;
a ramp generator configured to generate a ramp voltage according to transitions of said square-wave signal;
a second comparator configured to compare said ramp voltage with a direct voltage proportional to a switching half-cycle of the bridge and provide a second output signal; and
a logic element configured to emit respective second impulses in response to respective times that the second output signal of the second comparator and the first impulse output from the monostable circuit both have a high value.

20. The resonant converter according to claim 19, wherein the phase-shift detector includes a counter configured to count the second impulses output by said logic element and to halt the bridge when a number of said second impulses exceeds a prefixed value.

21. A resonant converter, comprising:
a resonant circuit;
a switching circuit that includes a bridge having first and second transistors, said bridge being configured to drive the resonant circuit; and
a control device configured to control the switching circuit, the control device including:
a square wave generator configured to generate a periodic square-wave signal for controlling said bridge; and
a phase-shift detector configured to detect a phase-shift between said periodic square-wave signal and a current flowing through the resonant circuit and configured to halt the bridge in response to detecting that said phase-shift exceeds a first phase-shift value, wherein said phase-shift detector includes:
a first comparator having first and second inputs, the first input being configured to receive a first signal which is representative of the current flowing through said resonant circuit and the second input being coupled to ground, the first comparator being configured to provide a first output signal based on detecting zero-crossings of said first signal;
a monostable circuit configured to receive the first output signal of said first comparator and to output a first impulse of prefixed duration in response to each time that the output signal of the first comparator has a transition;
a ramp generator configured to generate a ramp voltage correlated with transitions of said square-wave signal;
a second comparator configured to compare said ramp voltage with a reference voltage and provide a second output signal;
a first logic element to issue a third output signal at a selected logic value in response to the second output signal of the second comparator and a negated version of said square-wave signal have respective logic values that are equal; and
a second logic element configured to output respective second impulse in response to respective times that the third output signal of said first logic element and the first output signal from the first comparator both have the selected logic value.

22. The resonant converter according to claim 21, wherein the phase-shift detector includes a counter configured to count the second impulses output by said second logic element and to halt the bridge when a number of said second impulses exceeds a prefixed value.

23. A method for controlling a bridge of a switching circuit of a resonant converter, said control method comprising:
generating a periodic square-wave signal and driving said bridge with the periodic square-wave signal;
detecting a phase-shift between said periodic square-wave signal and a current flowing through a resonant circuit of the resonant converter;
halting said bridge by preventing driving the bridge with the periodic square-wave signal in response to detecting that said phase-shift exceeds a first phase-shift value; and
restarting said bridge after halting the bridge, the restarting including:
sampling a first signal representative of a difference between an output voltage from the resonant converter and a reference voltage and providing a second signal based the sampling of the first signal; and
comparing said first and second signals to each other and sending an activation signal activating the bridge when the first signal exceeds the second signal by a prefixed quantity.

24. A control device for controlling a switching circuit, including a bridge, of a resonant converter having a resonant circuit, said control device comprising:
a square wave generator configured to generate a periodic square-wave signal for controlling said bridge;
a phase-shift detector configured to detect a phase-shift between said periodic square-wave signal and a current flowing through the resonant circuit and configured to halt said bridge in response to detecting that said phase-shift exceeds a first phase-shift value; and an enabling controller configured to make said bridge operative again after the bridge is halted under control of the phase-shift detector, wherein said enabling controller includes:
- a sampler configured to receive a first signal representative of a difference between an output voltage from the resonant converter and a reference voltage and configured to provide a second signal based on a sampling of the first signal; and
- a comparator configured to compare said first and second signals and to send an activation signal for activating the bridge when the first signal exceeds the second signal by a prefixed quantity.

25. The device according to claim 24, wherein said comparator is a hysteresis comparator and said prefixed quantity is a hysteresis value of said comparator.

26. A resonant converter, comprising:
a resonant circuit;
a switching circuit that includes a bridge having first and second transistors, said bridge being configured to drive the resonant circuit; and
a control device configured to control the switching circuit, the control device including:
- a square wave generator configured to generate a periodic square-wave signal for controlling said bridge; and
- a phase-shift detector configured to detect a phase-shift between said periodic square-wave signal and a current flowing through the resonant circuit and configured to halt the bridge in response to detecting that said phase-shift exceeds a first phase-shift value, wherein the control device includes a turn-on controller configured to make said bridge operative again after the bridge is halted under control of the phase-shift detector, said turn-on controller including:
  - a sampler configured to receive a first signal representative of a difference between an output voltage from the resonant converter and a reference voltage and configured to provide a second signal based on a sampling of the first signal; and
  - a comparator configured to compare said first and second signals and to send an activation signal for activating the bridge when the first signal exceeds the second signal by a prefixed quantity.

27. The resonant converter according to claim 26, wherein said comparator is a hysteresis comparator and said prefixed quantity is a hysteresis value of said comparator.

* * * * *